UNITED STATES PATENT OFFICE.

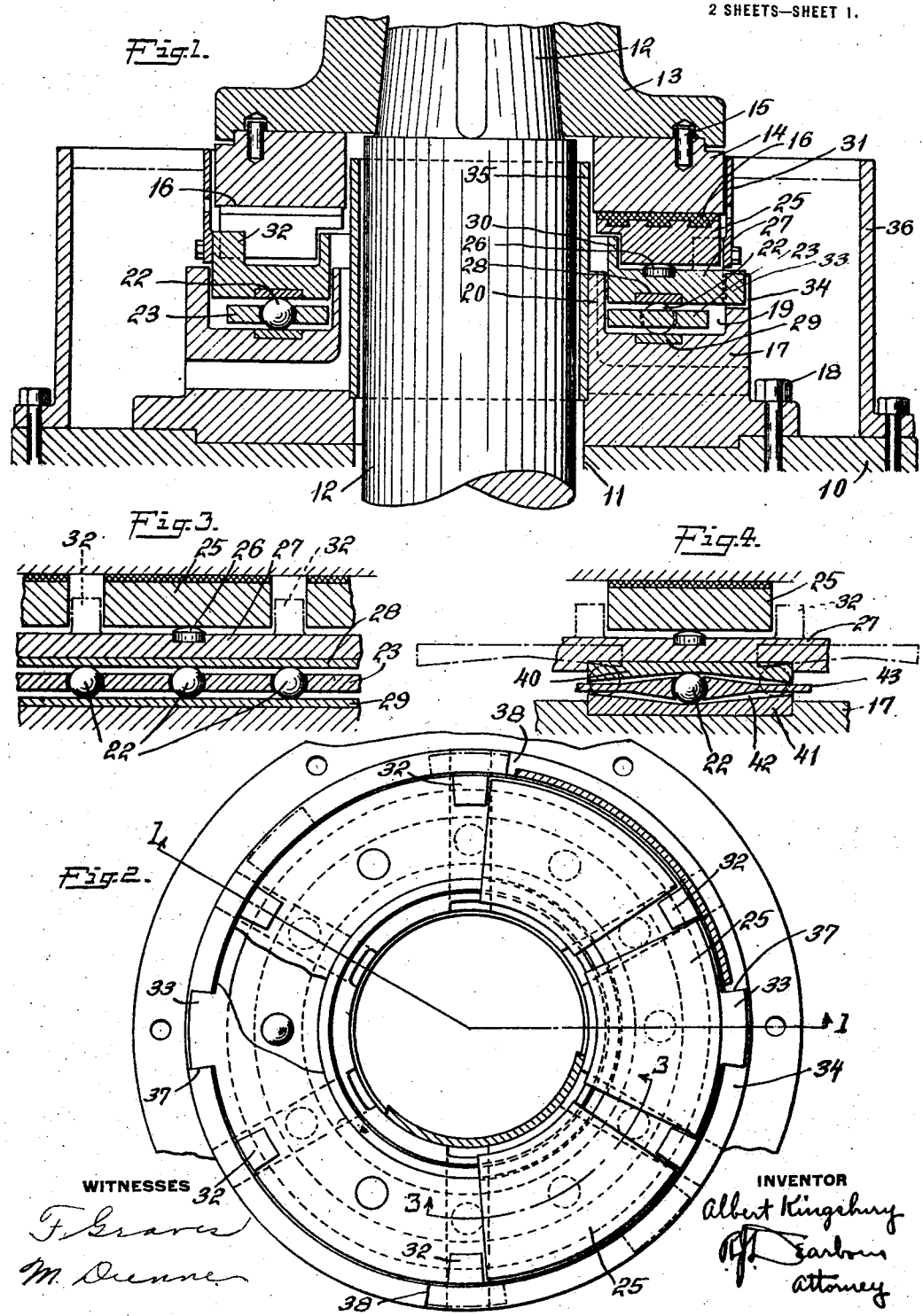
A. KINGSBURY.
BEARING.
APPLICATION FILED AUG. 16, 1916.
1,417,072.
Patented May 23, 1922.
2 SHEETS—SHEET 1.

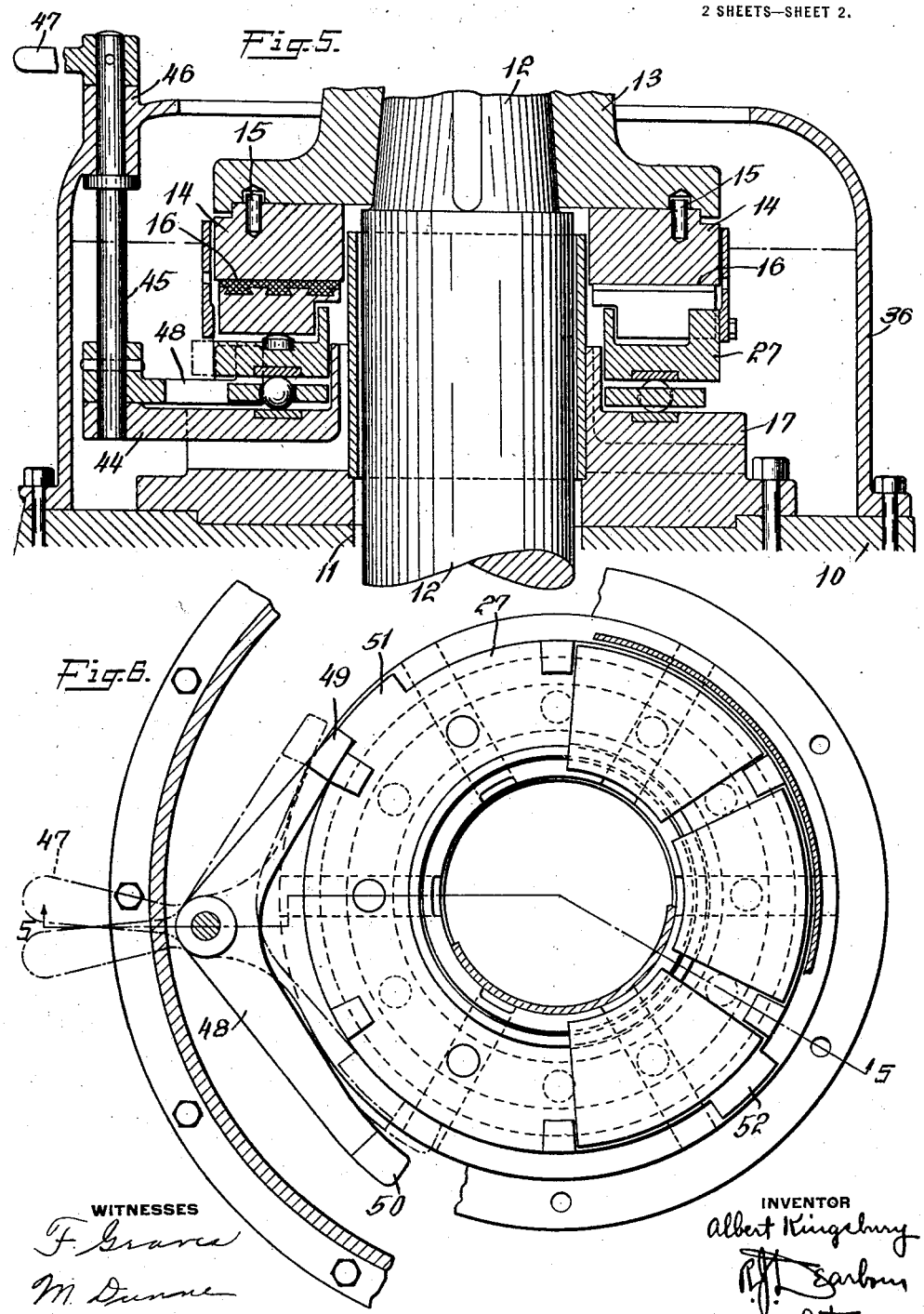

ALBERT KINGSBURY, OF PITTSBURGH, PENNSYLVANIA.

BEARING.

1,417,072.  Specification of Letters Patent.  Patented May 23, 1922.

Application filed August 16, 1916. Serial No. 115,124.

*To all whom it may concern:*

Be it known that I, ALBERT KINGSBURY, a citizen of the United States of America, and a resident of Pittsburgh, Allegheny County, and State of Pennsylvania, have invented certain new and useful Improvements in Bearings, of which the following is a specification, reference being had to the accompanying drawings, forming a part thereof.

My invention relates to bearings and has special reference to thrust bearings of the type employing bearing segments or shoes which are adapted to tilt in operation and automatically establish and maintain wedge-shaped oil films between the bearing surfaces.

One object of my invention is to provide an improved bearing that shall have the low-friction starting characteristics of a ball or roller bearing, but shall be arranged to operate with an automatically produced oil film between surface bearings, so as to avoid excessive wear on the bearing balls or rollers when the bearing is in operation.

Another object of my invention is to provide a simple and durable bearing of the aforesaid character that shall possess many of the advantages of ball bearings and which at the same time will retain the special advantages of bearings of the tiltable segment type.

Another object of this invention is to provide an improved bearing of this character in which the low-friction starting characteristics may be availed of each time the bearing is started and whether or not the direction of rotation be the same as that during the previous operation of the bearing.

It is well recognized that the starting friction of thrust bearings of the tiltable segment type is much greater than the running friction which is in fact very minute. For example, the coefficient of running friction of bearings of the tiltable segment type is about .001 while the coefficient of static friction is about .1. In other words, the friction at starting is about one hundred times as great as the running friction. In bearings of the ball or roller type, the starting friction is less than the starting friction of bearings of the tiltable segment type, but ball bearings are liable to excessive wear in operation particularly where the bearings are called upon to sustain heavy loads.

According to one embodiment of my present invention, I provide bearing segments which are normally stationary relative to the cooperating rotatable bearing member, a support on which the segments are tiltably mounted, a stationary base, and interposed rolling bearing members whereby the bearing segments and their primary supports are free to rotate on the rolling bearing members with the rotatable member for a limited distance at starting, the starting friction of the rotatable member being thus reduced to the starting friction of the rolling bearing. Means is provided for limiting the rotative movement of the support relative to the base, but when the limit is reached the momentum of the rotating parts is sufficient to overcome the starting friction between the bearing segments and the cooperating bearing surface. Once the starting friction is overcome and the oil film established, the bearing operates in the usual manner with a minimum of friction. Under these operating conditions the rolling bearing members are at rest and hence they are subjected to no appreciable wear and may be used for an indefinite length of time.

My invention is by no means limited to bearings of the tiltable segment type and broadly considered consists in an improved compound ball or roller and surface bearing provided with means whereby the ball or roller bearing is effective to reduce the starting friction and, after a predetermined period of operation, positively rendered inoperative. The surface bearing may have either curved bearing surfaces, such as a cylindrical shaft bearing, or plane surfaces, such as a thrust bearing of the shoe type.

Another object of my invention is to provide a bearing having a supporting member on which bearing segments are tiltably mounted, rolling bearing members for carrying the support, and means which tends to hold the support in a predetermined position, but is adapted to be temporarily overcome by the starting friction between the segments and the cooperating bearing surface. By this means the starting of the rotatable parts of the bearing is only retarded by the starting friction of the rolling bearings, and the segment support is automatically returned to its initial position as soon as the oil film is established between the bearing surfaces of the surface bearing.

Another object of this invention is to provide a bearing in which rolling bearing members are employed to overcome the starting friction of surface bearing members, with readily manipulated means whereby the low starting friction of the rolling bearing members may be taken advantage of each time the bearing is started whether the movable members are to move in the same or in the opposite direction to that in which they were previously moving.

In order that my invention may be thoroughly understood, I will now proceed to describe the same in the following specification, and then point out the novel features thereof in appended claims. The invention is capable of receiving a variety of mechanical expressions some of which are shown on the accompanying drawings, but it is to be expressly understood that the drawings are for the purpose of illustration only and are not to be construed as a definition of the limits of the invention, reference being had to the appended claims for that purpose.

Referring to the drawings:

Figure 1 is a sectional elevation, taken on the line 1—1 of Figure 2, of a bearing constructed in accordance with and constituting an embodiment of my invention.

Figure 2 is a sectional plan view of the same bearing, with the rotatable parts removed.

Figure 3 is a sectional elevation on the line 3—3 of Figure 2, developed into a single plane.

Figure 4 is a view, corresponding to Figure 3, of another structure which also embodies my invention.

Still another embodiment of my invention is shown in Figures 5 and 6, which correspond respectively to Figures 1 and 2, Figure 5 being a sectional elevation taken on the line 5—5 of Figure 6.

Like parts are designated by the same reference characters in all the figures, but special reference may first be had to Figures 1, 2 and 3.

In the form here shown, 10 is a stationary frame having a hole or opening 11, through which a shaft 12 extends. Affixed to the shaft near its upper end is a thrust block 13 with which cooperates the thrust collar 14. Dowel pins 15 or other suitable means extend from the collar into suitable recesses in the thrust block so that the collar is forced to rotate with the block and with the shaft to which the block is keyed or otherwise suitably attached. The collar has an annular bearing surface 16.

Mounted on the frame 10 is a base ring 17 which is held in place by bolts 18 or other suitable means and has an annular recess or channel 19 formed between ring projections 20 and 21. A plurality of rolling bearing members shown as bearing balls 22 are mounted in the channel 19, being held in place by a ball cage 23.

A plurality of bearing segments or shoes 25 are tiltably mounted in any suitable way as on hardened steel buttons or projections 26 of a shoe cage 27, which fits loosely into the channel 19 between the ring projections 20 and 21 and is mounted on the bearing balls 22 as clearly shown in Figure 1. The bottom surface of the shoe cage 27 is preferably provided with a hardened steel wearing ring 28 and the base ring 17 is preferably provided with a corresponding ring 29 on which the bearing balls 22 are supported.

The shoe cage has a flange 30 at its inner edge and a baffle ring 31 secured to a plurality of lugs 32 at its outer edge. The lugs 32 extend between the shoes and hold the shoes in their proper positions without interfering with the tilting of the shoes upon the buttons 26. The shoe cage 27 has one or more lateral lugs 33 each of which extends into a suitable elongated notch 34 in the ring projection 21. By this means the rotative movement of the shoe cage relative to the base ring 17 is limited although a sufficient extent of movement is permitted to allow the rotating parts of the bearing to acquire considerable momentum as hereinafter explained.

In order to provide an annular oil well or reservoir, a sleeve 35 loosely surrounds the shaft 12 and is secured to the base ring 17. It extends upwardly within the collar 14 above the bearing surface 16 and cooperates with an outer casing 36. The oil level is maintained at a sufficient height to flood the bearing surfaces.

The operation of the structure of Figures 1, 2 and 3, is as follows: Assume that the parts of the bearing occupy the positions shown in the drawings,—the rotatable member being at rest and the lugs 33 being in engagement with shoulders 37, at one end of the notches 34, if under these conditions the rotating parts including the shaft 12, the thrust block 13 and the collar 14 are driven in a clockwise direction, as viewed in Figure 2, the friction between the bearing surfaces of the shoes 25 and the annular bearing surface 16 of the collar will be sufficient to prevent slipping and hence the shoes, together with the shoe cage 27, will be rotatively moved until the lugs 33 come into engagement with the shoulders 38 at the opposite end of the notches 34. This movement is retarded only by the starting friction of the rolling bearings 22 which roll under the shoe cage. The rotating parts acquire a considerable momentum in moving through the limited arc permitted by the length of the notches 34 between the shoulders 37 and 38 and when the limits are reached the thrust collar 14 immediately slides upon the bearing surfaces of the shoes 25. In other words, the momentum of the parts is a primary factor in overcoming the starting friction of the bearing shoes.

When the bearing is thus started the oil films are instantly formed between the bearing surfaces and the bearing may run continuously with a very small coefficient of running friction. At the same time the bearing surfaces are extensive and are not subject to wear under heavy loads as ball or roller bearings would be if employed as a running bearing.

It is obvious that the rolling bearing members are at rest all the time when the bearing is in operation except during the starting period. Consequently, they are subject to no appreciable wear.

The above described arrangement is particularly adapted for use with bearings for apparatus which operate either alternately in opposite directions, or are automatically moved backward a short distance after they are brought to rest. An example of the latter condition is a bearing for pumps which, upon being stopped, are driven backward for a short distance by the reaction of the liquid upon the pump.

Of course, any suitable means might be employed for positively returning the parts to the position shown in the drawing, provided the rotating parts of the bearing are to be driven in the same direction.

In Figure 4 a modified structure is shown which is adapted to automatically return the parts to their initial positions after the bearing is once started, irrespective of the direction of rotation in which the bearing operates. The shoe cage 27 instead of being provided with a hardened steel ring 28 has a plurality of hardened steel blocks 40 and the base ring 17 is similarly provided with blocks 41. These blocks are preferably segmental annular members and their longitudinal sections, taken on a medial line and developed into a single plane as shown in Figure 4, is such as to form a double wedge-shaped opening 42 between them; in other words, their adjacent surfaces converge toward their ends and are spaced a maximum distance apart near their central points.

A ball cage 43 takes the place of the ball cage 23 of the previous figures and is shaped to fit loosely into the wedge-shaped openings 42 between the blocks. There are a pair of blocks for each shoe in the form shown so that one of the bearing balls 22 is normally disposed under the center of each shoe. With this arrangement, when the bearing is at rest, the parts occupy the positions shown in Figure 4 and when the bearing starts to operate the rotatable parts carry the shoes and the shoe cage with them for a limited distance determined by the engagement of the lugs 33 with suitably located shoulders corresponding to the shoulders 37—38. This rotative movement serves to raise the rotating member slightly on account of the wedge-shaped formation of the hardened blocks 40 and 41, there is consequently a tendency for the weight of the rotating parts to return the members to their initial position.

At starting, the friction between the bearing surfaces of the shoes and the annular bearing surface of the thrust collar is sufficient to move the shoe cage and shoes as already explained, but when the limit of motion is reached and the collar slips on the shoes the oil film is established as already explained and the friction between these members is reduced to a very small amount which is insufficient to overcome the tendency for the parts to return to their mid position, the slope of the surfaces of the blocks being designed to permit this result.

To illustrate the operation of this arrangement, it may be assumed that the coefficient or static friction between the bearing surfaces of the shoes and the cooperating surface of the collar is .1 and the coefficient of running friction when the oil film is established between the bearings surfaces may be assumed to be .001. If the angle of the wedge surfaces, on which the rolling bearing members operate, is too great, that is, if the slope be as large as one in ten, the arrangement will be inoperative because the static friction will not be sufficient to cause the bearing balls to enter the wedges. On the other hand, if the angle is too small, that is if the slope be as small as one in a thousand, the running friction will be sufficient to prevent the return of the parts to their initial positions. There is obviously a wide range of angles which may be successfully used and which fall between the limits explained.

Attention is directed to the fact that, with reference to Figure 4, the bearing is adapted to operate in either direction of rotation with equal facility, and in each case the parts are in position at starting to allow the rotating members to acquire a sufficient momentum to largely assist in overcoming the static friction of the bearing surfaces.

Referring to Figures 5 and 6, another embodiment of my invention is here shown which is similar in general to the structure of Figures 1, 2 and 3.

The outer annular projection 21 of the base ring 17 is omitted in this arrangement and the base ring is provided with a lateral lug 44 which forms a bearing for a vertical rod 45. This rod extends upwardly through a stationary bearing 46 formed in the casing 36 and has a handle lever attached to it near its upper end.

Mounted on the rod 45, between the bearings 46 and 44 and adjacent to the latter, is a bell crank lever 48. The arrangement of parts is such that when the handle 47 is turned, the bell crank lever 48 is swung from the full line position to the position indicated by broken lines in Figure 6. The respective arms of the bell crank lever are provided with lugs 49 and 50 which are adapted to be swung into and out of the path of movement of a pair of projections 51 and 52 which extend outwardly from the shoe cage 27 and correspond to the projections 33 of the previous figures.

Assuming that the parts are at rest and occupy the positions illustrated in full lines, with the lug 51 in engagement with the lug 49 of the bell crank lever, if the rotating parts of the bearing are started in a clockwise direction there is permitted a limited movement of the shoe cage and shoes which allows the rotating parts to acquire sufficient momentum to overcome the starting friction of the shoe bearing. This movement is limited by the lug 52 which comes into engagement with the opposite side of the lug 49.

The parts remain in this position until the bearing is brought to rest. If, then, it is desired to start it again in the same direction as before, i. e., clockwise, the bell crank lever is moved from the full line position to the dotted line position. This frees the lug 49 from engagement with the lug 52 and the shoe cage is permitted to move forward—with the thrust collar—on its rolling supports, until the advancing side of the lug 51 comes into engagement with the stop 50. A movement of the bell crank lever to the original full line position at the next start—in the clockwise direction—permits the shoe cage to again move forward until the lug 51 comes into engagement with the inside face of the stop 49. This sequence of operations can be repeated indefinitely, it being only necessary to move the bell crank lever to one or the other of its limiting positions to free the shoe cage for a limited circumferential movement with the thrust collar at each new start.

It is obvious that the same device can be utilized to control the preliminary movements of the shoe cage on its rolling bearings when the rotating parts of the bearing are repeatedly started in a counterclockwise direction. If, on the other hand, the bearing parts are alternately operated in opposite directions—i. e., first clockwise, then counterclockwise, or vice versa—or when the apparatus is of such a character that it automatically moves backward, or recoils, a slight distance after each stoppage, it is unnecessary to ever move the bell crank lever and it may be left always in either the full line or the dotted line position.

It will also be apparent that by varying the circumferential or angular distance between the two stops 49 and 50 on the lever 48; and by further varying either the number or the length, or both, of the lugs 51 and 52 on the shoe cage; any preliminary joint movement of the shoe cage and the thrust collar—up to substantially one-half revolution of the shoe cage—may be obtained at each starting of the bearing parts from rest.

While I have shown the ring of rolling bearing members interposed between two members of a relatively stationary portion of the bearing, e. g. between the shoe cage 27 and the base ring 17, it will be obvious that my invention can be equally well embodied in a structure in which the ball or roller bearings are interposed between two members or parts of the relatively movable portion; that is to say, the member 17 and its associated parts can be secured to the revolving shaft, and the associated thrust members 13 and 14 can be bolted to the stationary frame without in any way altering the functional performance of the apparatus hereinbefore described. Or the ball or roller bearings can be interposed between the thrust block 13 and the collar 14, and the lug and stop connections 33—37—38, etc., applied to the edges of these two members instead of to the shoe cage and base ring.

Various other modifications of the structures illustrated may be made without departing from the spirit and scope of my invention which contemplates the combination of a ball or roller bearing with a sliding surface bearing in such manner that at the start of the movement the frictional load is carried entirely by the rolling elements,—the surface bearing elements remaining at rest with respect to each other—and then, after a short interval of rolling action, the relative movement of the rolling bearing parts is wholly arrested and the relative sliding movement of the surface bearing elements is initiated and continued until the bearing movement is stopped. Stated more in detail my present invention resides in splitting or dividing one of the relatively movable members of a surface bearing into two parts; in interposing a ball or roller bearing between these parts; and in providing means whereby, after a limited initial relative movement of the parts on the interposed balls or rollers, the said parts are stopped or locked against further relative movement—thus arresting all further operation of the ball or roller bearing elements—without interfering with, or in any way modifying, the normal intended operation of the surface bearing elements.

What I claim is:

1. A bearing comprising a movable load carrying member, a stationary member, a pair of cooperating bearing parts interposed between the stationary and movable members and respectively associated therewith, rolling bearing members interposed between one of the bearing parts and the member with which it is associated and arranged to be active in either direction, and means for rendering the rolling bearings inactive after the bearing has been started in either direction.

2. A bearing comprising a rotatable member, a stationary member, a pair of interposed surface bearing parts between the rotatable and stationary members and respectively associated therewith, rolling bearing interposed between one of the bearing parts and the member with which it is associated and arranged to be active in either direction of rotation, and means for causing the surface bearing parts to carry the load after the bearing is started on the rolling bearings.

3. A bearing comprising a rotatable member having an annular bearing surface, a plurality of bearing shoes cooperating therewith, a stationary support, rolling bearing members interposed between the support and the shoes, and means for permitting a limited rotative movement of the shoes on the rolling bearing without varying the thrust pressure sustained by the several shoes.

4. A bearing comprising a movable load-carrying member, a stationary member, a pair of cooperating bearing parts interposed between the stationary and movable members and respectively associated therewith, rolling bearing members interposed between one of the bearing parts and the member with which it is associated, means for limiting the movement of the cooperating parts on the rolling bearings in either direction from a predetermined intermediate position, and means tending to hold the parts in said intermediate position.

5. A bearing comprising a rotatable member, a stationary member, a pair of cooperating bearing parts interposed between the stationary and rotatable members and respectively associated therewith, rolling bearing between one of said bearing parts and the member with which it is associated, means for limiting said rotative movement of the bearing part on the rolling bearing in either direction, and means, adapted to be temporarily overcome by the friction between the cooperating bearing parts, for centering said bearing part between its limits.

6. A bearing comprising a rotatable member having an annular bearing surface, a plurality of cooperating bearing shoes, a stationary support, interposed rolling bearing members between the support and the shoes, means for positively limiting the rotative movement of the shoes on the rolling bearing members, and means for centering the shoes relative to said limits, said means being adapted to be overcome by the starting friction between the shoes and the cooperating bearing surface and adapted to overcome the running friction between said members and center the shoes when the bearing is in operation.

7. A bearing comprising a rotatable member having an annular bearing surface, a stationary support having a plurality of double wedge-shaped blocks, a rolling bearing member supported on each block, a shoe cage mounted on the rolling bearing members and having correspondingly located double wedge-shaped blocks cooperating with said members, and bearing shoes pivotally mounted on the cage and cooperating with the annular bearing surface.

8. A bearing comprising two relatively rotatable surface bearing members, one of said members being composed of two parts capable of a limited rotative movement with respect to each other to permit one of said parts to move with the other said member without relative movement therebetween, and means for arresting all rotative movement of the said parts when the surface bearing members are in normal operation.

9. A bearing comprising members having cooperating surfaces adapted to be automatically lubricated when the bearing is running, means for permitting a material limited movement of the cooperating members together in either direction whereby the momentum of the moving parts is available to overcome the starting friction between the members, and means for arresting the movement of one of said members without disturbing the cooperative engagement of the bearing surfaces.

10. A bearing comprising members having cooperating surfaces adapted to be automatically lubricated when the bearing is running, means for rotatively supporting at least one of the bearing members, and means for permitting a material but limited conjoint movement of the cooperating members, whereby the momentum of the moving parts is available to overcome the starting friction between the members, without disturbing the normal cooperative relationship between the bearing surfaces.

11. A bearing comprising a rotatable support, a bearing part associated therewith, a stationary support, a cooperating bearing part mounted thereon, and means for permitting a substantial rotative movement of one of the bearing parts relative to its support, whereby the momentum of the moving member is utilized to overcome the starting friction between the bearing parts without disturbing the functional relationship between the cooperating bearing surfaces.

12. A bearing comprising a member having an annular bearing surface, a plurality of tiltable bearing shoes having cooperating bearing surfaces adapted to be automatically lubricated when the bearing is in operation, and means for permitting a substantial initial joint movement of the bearing member and the shoes, for overcoming the starting friction between the cooperating bearing surfaces and then checking the movement of one of the parts, without affecting the relationship between the tiltable bearing shoes and the annular bearing surface.

13. A bearing comprising a member having an annular bearing surface, a plurality of tiltable bearing shoes having cooperating bearing surfaces adapted to be automatically lubricated when the bearing is in operation, and means for permitting a limited initial joint movement of the annular bearing surface and the shoes whenever the bearing starts in either direction.

14. A bearing comprising two relatively movable surface engaged members, one of said members being divided or split substantially parallel to the plane of surface movement, a ball or roller bearing interposed between the divided parts, and means for arresting any relative movement of the said parts when the bearing is in normal operation.

15. A bearing comprising two relatively movable load carrying members one of said members being divided into two substantially parallel annuli, a plurality of balls or rollers interposed between the said annuli, and means for preventing any movement of the said balls and rollers when the load carrying members are in normal relative movement.

16. A bearing comprising relatively fixed and relatively movable bearing members, means for permitting an initial joint movement of the members when the bearing starts in either direction, and means for arresting the movement of one of the members after a predetermined initial joint movement has taken place.

17. A bearing comprising cooperating surface bearing members, rolling bearings, means for rendering the rolling bearings active in advance of the surface bearing for successive starts in either direction, and means for arresting the rolling bearings after a predetermined movement thereof.

18. A bearing comprising a pair of relatively rotatable parts, surface bearing members associated with the respective parts, rolling bearings, means for causing the rolling bearings to take the starting friction of the relatively moving parts when starting in either direction of rotation, and means to stop the rolling bearings, whereby the starting friction of the surface bearing members is overcome by the momentum of the rotating parts.

19. A thrust bearing comprising cooperating surface bearing members, rolling bearings, and means for rendering the surface bearing members active and the rolling bearings inactive after the bearing has started on the rolling bearings through a substantial but predeterminately limited distance.

20. In a bearing, relatively rotatable bearing members, rolling members on which one of said members is mounted to rotate through a limited distance with the other of said members without variation of the distribution of pressure on said members, and means for stopping said member after the same has moved through said limited distance to cause the further relative rotation to take place between said bearing members.

21. In a bearing, relatively rotatable bearing members, means comprising rolling members for mounting one of said bearing members so that the same may rotate through a limited distance with its opposed bearing member when started in either direction, and means for stopping said bearing member after the same has moved through said limited distance to cause the further relative rotation to take place between said bearing members.

22. In bearing, relatively rotatable bearing members comprising a plurality of bearing segments, rolling members on which said segments are mounted to rotate with the opposed bearing member through a distance greater than the distance between the points of supports of successive segments, and means for thereafter stopping said segments to cause said opposed bearing member to rotate with respect thereto.

23. In a bearing, relatively rotatable bearing members, rolling means associated with one of said bearing members whereby the same may rotate with its opposed bearing member through a limited distance without relative movement between said members, and means to stop said bearing member after it has rotated through said limited distance to cause relative rotation between said bearing members by the momentum of said opposed bearing member.

24. In a bearing, relatively rotatable bearing members comprising a plurality of bearing segments, mounting means for said segments constructed to permit said segments to rotate with the opposed bearing member through a limited distance without relative movement between said segments and opposed bearing member, and means for stopping the rotation of said segments to enforce relative rotation between said segments and the opposed bearing member.

25. In a bearing, relatively rotatable bearing members including a plurality of bearing segments, a relatively fixed support, rolling means mounting said segments on said support and adapted to permit said segments to rotate with the opposed bearing member through a limited distance without relative movement between said bearing members, and means to stop the rotation of said segments to enforce relative rotation between said bearing members.

26. In a bearing, relatively rotatable bearing members, means mounting one of said members whereby it may rotate with the other of said members through a limited distance without relative movement between said members, and means to stop said last-named member to enforce relative rotation between said bearing members.

27. In a bearing, relatively rotatable bearing members, a rolling bearing on which one of said members is mounted to rotate with its opposed bearing member through a limited distance each time the bearing is started and irrespective of its direction of rotation, and means to stop the rotation of said bearing member to enforce relative rotation between said bearing members.

28. In a bearing, relatively rotatable bearing members, a rolling bearing on which one of said members is mounted to rotate with its opposed bearing member through a limited distance in either direction from an intermediate position, and means to stop the rotation of said bearing member to enforce relative rotation between said bearing members.

29. In a bearing, relatively rotatable bearing members, a rolling bearing on which one of said members is mounted to rotate through a limited distance in either direction with its opposed bearing member, means for returning said rolling bearing to an intermediate position to render it thereafter effective for either direction of rotation, and means to stop the rotation of said bearing member on said rolling bearing to enforce relative rotation between said bearing members.

30. In a bearing, relatively rotatable bearing members, a rolling bearing on which one of said members is mounted to rotate through a limited distance in either direction with its opposed bearing member, oppositely inclined surfaces for returning said rolling bearing to an intermediate position to render it thereafter effective for either direction of rotation, and means to stop the rotation of said bearing member on said rolling bearing to enforce relative rotation between said bearing members.

31. In a bearing, relatively rotatable bearing members including a plurality of bearing segments, a rolling bearing on which said segments are mounted to rotate through a limited distance with the opposed bearing member in whatever direction the bearing is started, and means to stop the rotation of said segments to enforce relative rotation between said segments and the opposed bearing member.

32. In a bearing, relatively rotatable surface bearing members, rolling bearing members on which one of said first-named bearing members may roll without interrupting the surface contact between said members, and means to stop said last-named bearing member to enforce relative sliding movement between said surface bearing members.

33. In a bearing, relatively rotatable bearing members including a plurality of bearing segments, means tiltably mounting said segments, a rolling bearing for said mounting means whereby said segments may rotate through a limited distance with the opposed bearing member without relative movement between said bearing members, and means to stop the rotation of said segments to enforce relative rotation between said bearing members.

34. In a bearing, relatively rotatable bearing members including a plurality of bearing segments, means tiltably mounting said segments, a rolling bearing for said mounting means whereby said segments may rotate with the opposed bearing member through a limited distance in whatever direction the bearing is started, and means to stop the rotation of said segments to enforce relative rotation between said bearing members.

35. In a bearing, relatively rotatable bearing members including a plurality of bearing segments, rolling means on which one of said bearing members is mounted for rotation with the opposed bearing member through a limited distance without varying the points of support of said segments, and means to stop the rotation of said bearing member to enforce relative rotation between said bearing members.

36. In a bearing, relatively rotatable bearing members including a plurality of bearing segments, means for tiltably mounting said segments, rolling means on which said segments are mounted for rotation through a limited distance with the opposed bearing member without moving said mounting means with respect to said segments, and means to stop the rotation of said segments to enforce relative rotation between the same and the opposed bearing member.

37. A bearing comprising cooperating surface bearing members, rolling bearing members on which one of said surface bearing members may move without changing the support of said member, and means for stopping said member after it has moved on said rolling bearing members a limited distance.

38. A bearing comprising cooperating surface bearing members, rolling bearing members on which one of said surface bearing members may move in either direction without changing the support of said member, and means for stopping said member after it has moved on said rolling bearing members a limited distance.

39. In a bearing, relatively rotatable bearing members including a plurality of bearing segments, rolling means on which one of said members is mounted for rotation with the opposed bearing member through a limited distance in either direction without varying the points of support of said segments, and means to stop the rotation of said bearing member to enforce rotation between said bearing members.

40. In a bearing, relatively rotatable surface bearing members and means for overcoming the starting friction between said members comprising rolling members on which one of said bearing members may move a limited distance without varying the points of support of said member, and means to stop said member to enforce relative rotation between said surface bearing members.

41. In a bearing, relatively rotatable surface bearing members and means for overcoming the starting friction between said members comprising rolling members on which one of said bearing members may move a limited distance in either direction without varying the points of support of said member, and means to stop said member to enforce relative rotation between said surface bearing members.

42. In a bearing, relatively rotatable surface-bearing members, rolling members on which one of said members is mounted to rotate through a substantial but limited distance with the other of said members, and means for stopping said member after the same has moved through said limited distance to enforce relative rotation between said members.

43. In a bearing, relatively rotatable surface-bearing members having their bearing surfaces in engagement when the bearing is at rest, rolling bearing members on which one of said surface-bearing members is mounted so that the same is moved by the friction between said bearing surfaces when the bearing is started, and means for rendering said rolling members inactive after said surface-bearing members have rotated through a substantial distance.

In witness whereof, I have hereunto set my hand, this 5th day of August, 1916.

ALBERT KINGSBURY.